(12) United States Patent
Perrin et al.

(10) Patent No.: US 9,663,004 B2
(45) Date of Patent: May 30, 2017

(54) SYSTEMS FOR SOOTHING AND PROLONGING SLEEP OF A CHILD IN A CAR SEAT

(71) Applicants: Heather F. Perrin, Boulder, CO (US); Perry Youngs, Mead, CO (US)

(72) Inventors: Heather F. Perrin, Boulder, CO (US); Perry Youngs, Mead, CO (US)

( * ) Notice: Subject to any disclaimer, the term of this patent is extended or adjusted under 35 U.S.C. 154(b) by 0 days.

(21) Appl. No.: 14/216,718

(22) Filed: Mar. 17, 2014

(65) Prior Publication Data

US 2014/0265480 A1   Sep. 18, 2014

Related U.S. Application Data

(60) Provisional application No. 61/802,481, filed on Mar. 16, 2013.

(51) Int. Cl.
| | |
|---|---|
| *A47C 31/00* | (2006.01) |
| *A47C 27/00* | (2006.01) |
| *B60N 2/26* | (2006.01) |
| *B60N 2/28* | (2006.01) |
| *B60N 2/02* | (2006.01) |
| *B60N 2/44* | (2006.01) |

(52) U.S. Cl.
CPC ............ *B60N 2/26* (2013.01); *B60N 2/28* (2013.01); *B60N 2/2821* (2013.01); *B60N 2/2845* (2013.01); *B60N 2/44* (2013.01); *B60N 2002/0268* (2013.01); *B60N 2002/0272* (2013.01)

(58) Field of Classification Search
CPC ...... B60N 2/44; B60N 2/0268; B60N 2/0272; B60N 2002/0268; B60N 2002/0272
USPC ......... 297/217.1, 217.2, 217.3, 217.4, 217.5, 297/217.6; 340/692
See application file for complete search history.

(56) References Cited

U.S. PATENT DOCUMENTS

| | | | | |
|---|---|---|---|---|
| 6,854,799 | B1 * | 2/2005 | Asbach et al. ............... | 297/136 |
| 7,551,100 | B1 * | 6/2009 | Salley ..................... | A47D 9/02 |
| | | | | 340/691.1 |
| 8,690,245 | B2 * | 4/2014 | Tuckey ................ | A47D 13/105 |
| | | | | 297/260.2 |
| 8,981,700 | B2 * | 3/2015 | Okada et al. ................. | 318/490 |
| 2005/0280297 | A1 * | 12/2005 | Patterson et al. .......... | 297/217.4 |
| 2011/0089729 | A1 * | 4/2011 | Gibree ...................... | 297/217.4 |
| 2013/0166154 | A1 * | 6/2013 | Kohara .......................... | 701/49 |
| 2014/0210239 | A1 * | 7/2014 | Yetukuri et al. ........... | 297/217.1 |

* cited by examiner

*Primary Examiner* — Chi Q Nguyen

(57) ABSTRACT

Systems for soothing and prolonging sleep maintain an experience of riding in a vehicle in a car seat, even as a pattern of driving changes, when vehicle motion ceases or when the car seat is removed from the vehicle. Sensors detect one or more of motion, light and sound in an environment of the car seat. As motion, light and/or associated with the ride decrease, change or stop, a controller automatically controls actuators to apply compensatory motion, light and/or sound in the environment of the car seat, in order to provide continuity of the riding experience and decrease likelihood of an infant awakening or fussing. This allows the driver of the vehicle to concentrate on driving safely, rather than breaking concentration on the road in order to soothe the infant.

31 Claims, 7 Drawing Sheets

SYSTEMS FOR SOOTHING AND PROLONGING SLEEP OF A CHILD IN A CAR SEAT

RELATED APPLICATIONS

This application claims priority to U.S. Patent Application Ser. No. 61/802,481, filed Mar. 15, 2013, and incorporated herein by reference.

BACKGROUND

It is well known that babies and infants quickly fall asleep when in a car seat of a moving vehicle. Parent have been known to place a crying infant in the car seat and drive the vehicle to get the infant to sleep. However, the infant often awakens when the vehicle stops moving temporarily or for an extended period. When an infant awakens and begins to fuss mid-drive, a parent or caregiver may sacrifice driving safely, in order to continue driving while simultaneously attempting to soothe the infant.

SUMMARY OF THE INVENTION

The disclosed systems for soothing or prolonging sleep are operable to maintain an experience of riding in a car, even as a pattern of driving changes or decreases in intensity, when driving stops completely and when a car seat is removed from a car. As motion, sound and/or light associated with a car ride decreases or stops, the disclosed systems automatically provide compensatory motion, sound and/or light, in order to provide continuity of the riding experience and to decrease the likelihood of an infant or child awakening or fussing. This allows the driver of the car to concentrate on driving safely, rather than breaking his or her concentration in attempts to soothe the infant or child. Furthermore, a simulated riding experience may continue as the car seat is removed form the car, allowing parents or caregivers to transport a sleeping child into a house, stroller or to another location without disrupting sleep.

In one embodiment, a system for soothing or prolonging sleep of a child in an environment of a car seat includes at least one actuator configured with the car seat or a base of the car seat, for imparting one or more of movement, sound and light to the environment. At least one sensor senses a condition of the environment, and a controller controls the actuator to induce one or more of motion, sound and light to the environment based upon the sensed condition, such that a level of the sensed condition remains substantially constant.

In one embodiment, a system for soothing or prolonging sleep of a child in an environment of a car seat includes at least one actuator for imparting one or more of motion, sound and light to the environment. The actuator is configured with a cushion for fitting into and accepting safety harnessing of a car seat. At least one sensor senses a condition of the environment, and a controller controls the actuator to induce one or more of motion, sound and light, based upon the sensed condition, such that overall changes to motion, sound and/or light are minimized within the environment of the car seat.

In one embodiment, a sleep and wake system for public transport includes at least one actuator configured with a seat of a public transportation vehicle, for imparting one or more of movement, sound and light to an environment of the seat. A sensor senses a condition of the environment of the seat. A microprocessor compares the sensed condition with a threshold level for the sensed condition, and a controller controls the actuator to add one or more of motion, sound, and light to the environment based upon the sensed condition, when the sensed condition approaches or falls below a threshold level, such that a level or characteristic of the sensed condition remains relatively constant despite an ambient decrease in the sensed condition.

DETAILED DESCRIPTION OF THE EMBODIMENTS

Figure 1:
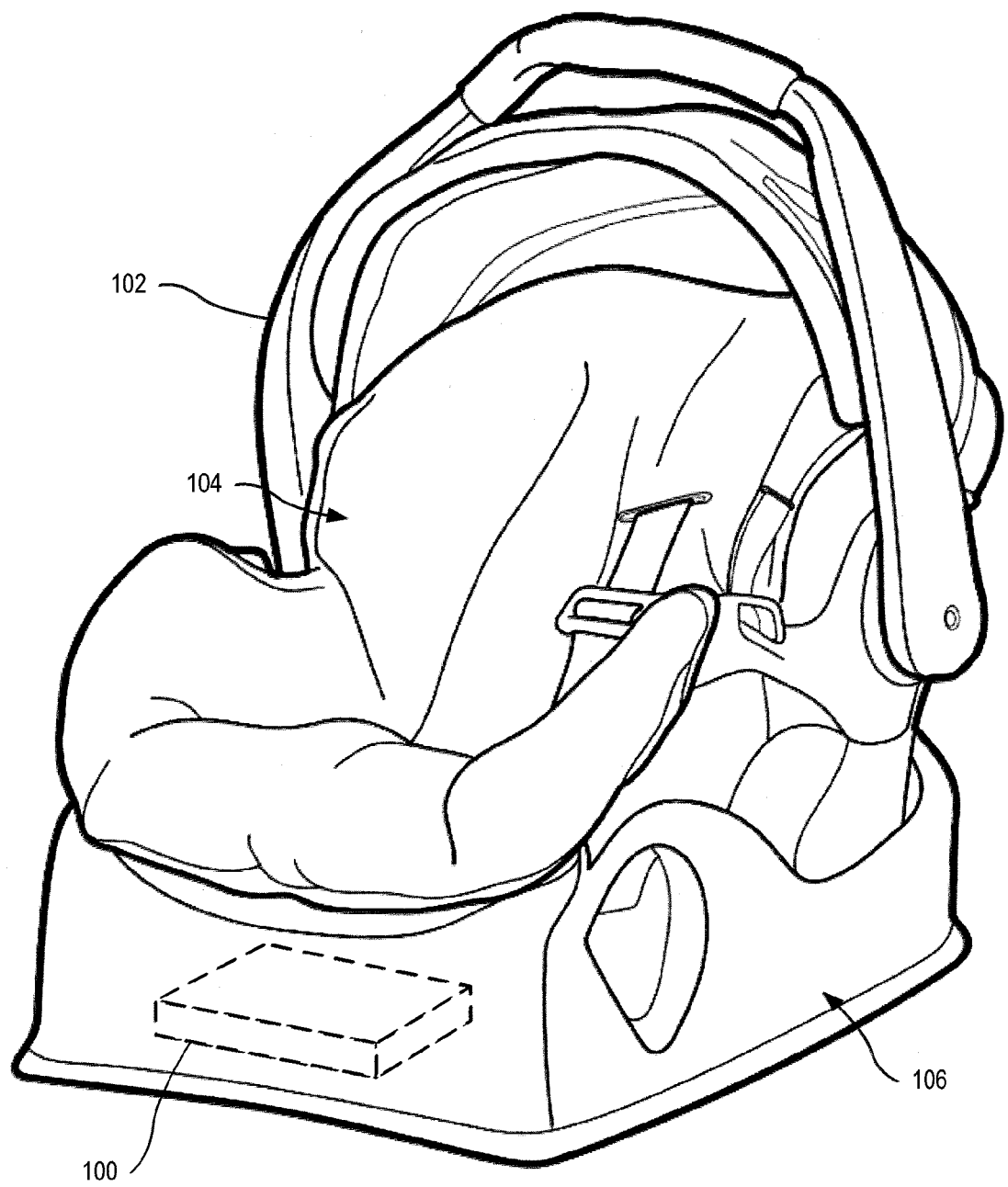
FIG. 1 shows one exemplary car seat configured with a system for soothing and prolonging sleep of a child, in an embodiment.

FIG. 1 shows one exemplary car seat 102 configured with a system 100 for soothing and prolonging sleep of a child. System 100 is for example located, at least in part, within a base of an infant car seat 102 and operates to sense an environment 104 of the infant in car seat 102 when traveling within a vehicle for example, and then operates to maintain one or more of movement, audio, and light within environment 104 when the vehicle stops (e.g., momentarily during a journey or at an end of the journey) and when car seat 102 is removed from the vehicle. The vehicle is one of a road vehicle, a rail vehicle, an airplane, a sea vessel, and other such vehicles that are used to transport an infant in a car seat. In one embodiment, system 100 senses a condition, such as movement (e.g., vibration), audio, and/or light within environment 104 when moving in the vehicle, and then generates one or more of similar movement, similar audio, and similar light to car seat 102 to maintain sensed condition(s) within environment 104 such that the infant's sleep is not disturbed by an abrupt change in the sensed condition(s), thereby allowing the parent or guardian to transfer the infant to another location without waking.

Figure 2:
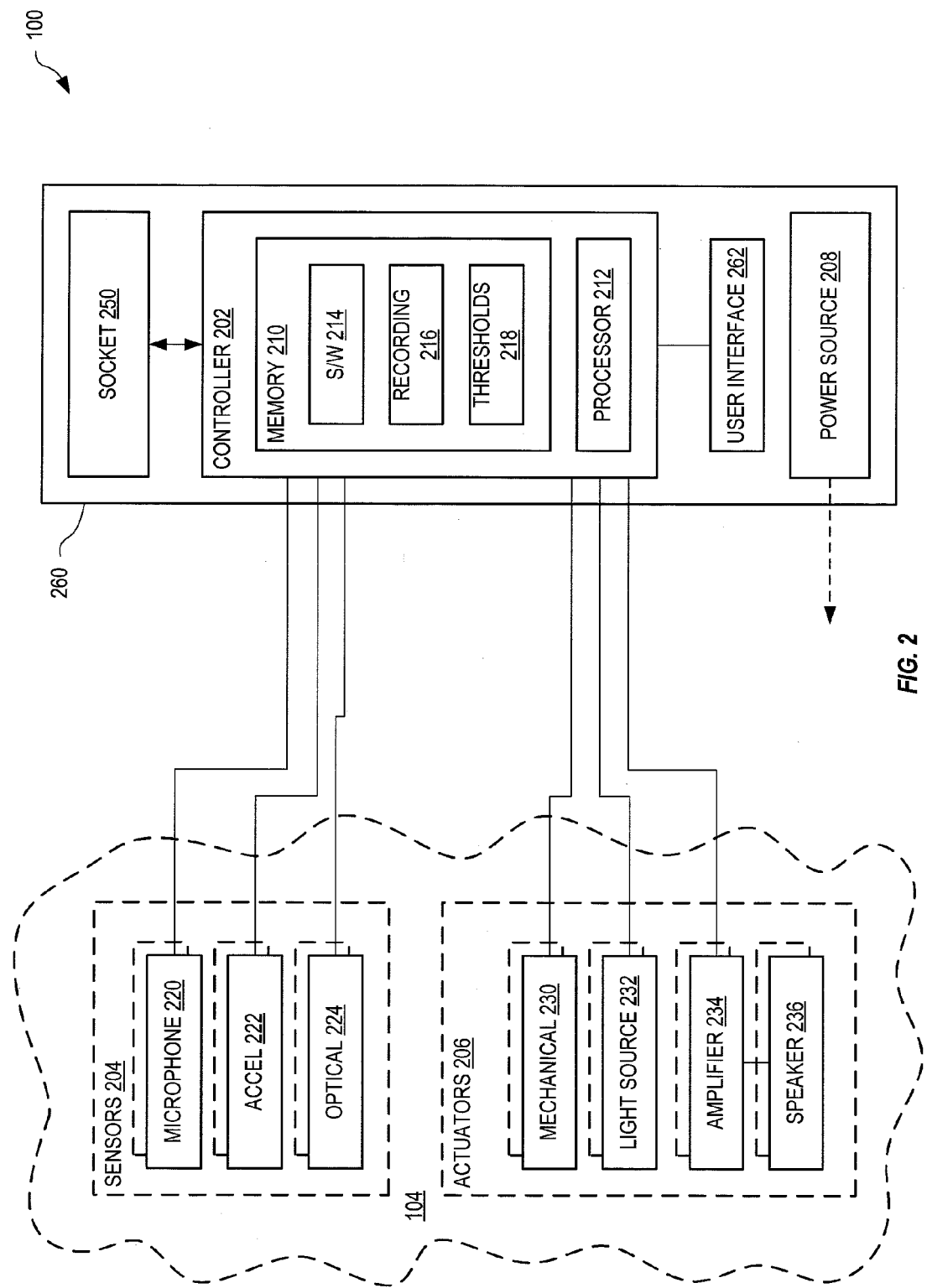
FIG. 2 is a schematic showing the system of FIG. 1 in further exemplary detail.

FIG. 2 is a schematic showing system 100 of FIG. 1 in further exemplary detail. System 100 includes a controller 202, at least one sensor 204, at least one actuator 206, and a power source 208. Power source 208 is for example one of a battery (optionally rechargeable) and an adaptor/converter that converts power from other sources for use with system 100. Sensors 204 and actuators 206 may include additional electronics and components that facilitate use by controller 202. Sensors 204 sense a condition within the environment of the car seat. Motion, sound and light are exemplary sensed conditions.

Sensors 204 include one or more of a microphone 220 for detecting sounds within environment 104, an accelerometer 222 for detecting movement and vibration within environment 104, and an optical sensor 224 for detecting light within environment 104. Actuators 206 operate under control of controller 202 and include one or more of a mechanical actuator 230 that imparts movement and vibration to environment 104, a light source 232 that imparts light (either directly or indirectly) to environment 104, and an amplifier 234 that drives a speaker 236 to generate audio within environment 104.

Controller 202 has a memory 210 and a processor 212. Memory 210 is shown with software 214 that comprises machine readable instructions that are executed by processor 212 to receive information from sensors 204 and control actuators 206 (e.g., as a function of the received information).

In one embodiment, accelerometer 222 and mechanical actuator 230 are built into car seat 102 (e.g., on a bottom or back area of car seat 102). In another embodiment, accelerometer 222 and mechanical actuator 230 are built into a base portion 106 of car seat 102, and may be combined within a housing 260 of controller 202. In one embodiment, activation level of actuators 206 by controller 202 is proportional to levels sensed by sensors 204 relative to thresholds 218.

Components of system 100 (e.g., controller 202, sensors 204, actuators 206 and power source 208) may share housing 260. In one aspect, housing 260 is attachable to car seat 102. In another embodiment, housing 260 is built into or otherwise configured with the car seat 102 or car seat base 106. Alternately, housing 260, car seat 102 or base 106 may contain controller 202 and mechanical actuator 230, and one or more of sensors 204 (e.g., microphone 220, accelerometer 222) may be located remotely, such as for example, attached to or built into another location in a car, wherein the one or more sensors 222 may communicate wirelessly with controller 202 (e.g., controller 202 includes a wireless transceiver implementing a protocol such a Bluetooth, or other protocols).

In one example of operation, controller 202 receives data from one or more of microphone 220, accelerometer 222, and optical sensor 224 and creates a recording 216 within memory 210 indicative of sensed environment 104. Recording 216 is not limited to audio, but includes data representative of light and motion conditions of environment 104 as well. As sensed stimulation within environment 104 reduces (e.g., as the vehicle slows down or stops at a traffic light) below one or more predefined thresholds 218, controller 202 activates one or more of mechanical actuator 230, light source 232, amplifier 234 and speaker 236 to add stimulus to environment 104. For example, as levels of vibration and/or movement sensed by accelerometer 222 reduce, controller 202 may activate mechanical actuator 230 to impart one or both of vibration and motion to environment 104 within car seat 102. In another example, as levels of sound sensed by microphone 220 reduce, controller 202 may activate amplifier 234 and speaker 236 to impart sound to environment 104. In one embodiment, controller 202 replays sound of recording 216 through speaker 236. In another example, controller 202 includes a noise generator (e.g., implemented within software 214) that generates a white noise, simulated engine noise, simulated road noise, simulated traffic noise, etc., for play through speaker 236.

In one embodiment, mechanical actuator 230 and amplifier 234 and speaker 236 are combined with controller 202 and positioned within housing 260 that is situated within car seat base 106, wherein speaker 236 operates to project generated sound to environment 104. In another embodiment, speaker 236 is a Piezo element that is configured with car seat 102 and positioned within environment 104, such as behind cushioning proximate the infant's head, wherein generated sound levels are relatively imperceptible outside of environment 104.

Figure 3:
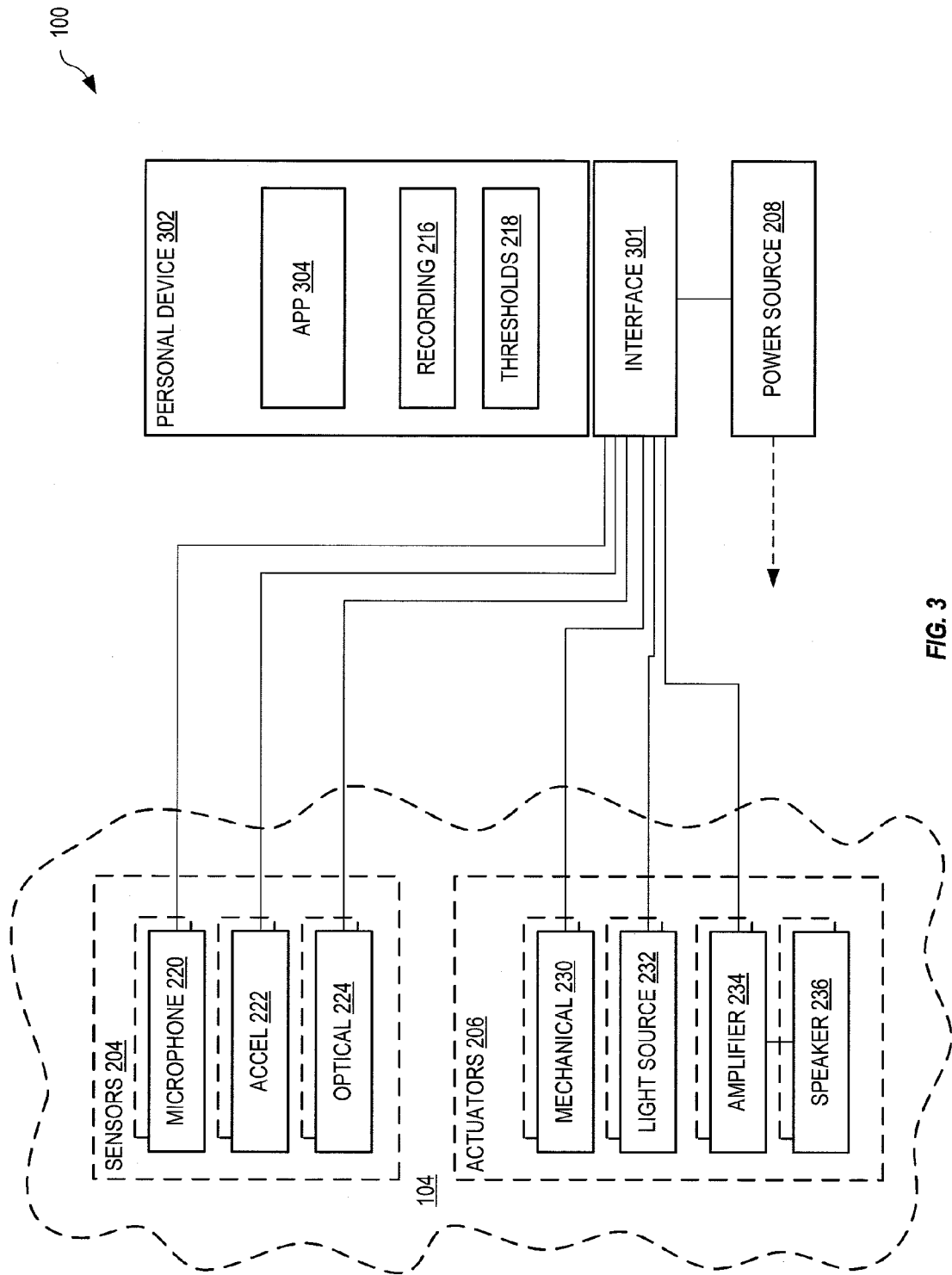
FIG. 3 is a schematic showing the system of FIG. 1 incorporating control by a personal device, in an embodiment.

FIG. 3 is an alternate embodiment wherein controller 202 is replaced by an interface 301 that communicatively couples with a personal device 302, such that personal device 302 operates to control functionality of system 100 as described herein. Personal device 302 is for example one of an MP3 player, an iPod, an iPod nano, an iPod mini, an iPad, an iPhone, a tablet, a smart phone, a personal digital assistant (PDA), or other similar personal electronic device that couples directly (e.g., docks with) interface 301 or couples wirelessly with interface 301 using a proprietary or standard protocol (e.g., Bluetooth, Wi-Fi, etc.). In one example, interface 301 is a cable that couples with a smart phone.

In one embodiment, system 100 includes a socket 250 that accepts one or both of a memory stick and a memory card for storage of sounds (e.g., WAV files) and optionally recording 216.

In one embodiment, recording 216, representative of auditory conditions within environment 104, is relayed to a server (not shown) where the server matches signals within recording 216 to a database of sounds to identify one or more components thereof. For example, where personal device 302 is a communication device (e.g., a smart phone), an application (app) 304 uses connectivity (e.g., Wi-Fi and/or service provider communication) of the personal device to communicate with the server. For example, the server may identify a song that is heard within environment 104. In the embodiment of FIG. 3, app 304 running on personal device 302 may identify one or more sounds within recording 216 as a song heard within environment 104 and may thereby select that song within a playlist of personal device 302 for playback through speaker 236 when sound level within environment 104 drops below one threshold 218, such that sounds within environment 104 are maintained, even when the song playing within the vehicle is significantly reduced or abruptly terminated, such as when the vehicle reaches a destination and the ignition (and thereby sound source such as a radio) is turned off.

Software 214 running in controller 202 and app 304 running in personal device 302 may operate to match the ambient noise detected within environment 104 with recordings in memory 210 and playlists within personal device 302 and operate to mix these matched recording together for playback through speaker 236 when sound level within environment 104 drops below one or more thresholds 218. These recordings may include white noise, engine noise, traffic noise, conversation (from calm and intermittent to argumentative), weather-related noise (such as wind or rain noise), and/or music. As ambient noise within environment 104 reduces and falls beneath thresholds 218, complementary noise (i.e., matching white noise, engine noise, traffic noise, conversation and/or music) may be played from controller 202 or personal device 302 through speaker 236 and into environment 104, with volume ramping up as ambient noise falls further and further below the threshold level, to maintain a constant and similar noise type/combination of types within environment 104.

Where a sound within recording 216 is matched by the server, but not present within a playlist of personal device 302, personal device 302 may automatically download a recording of that sound from the server and play back the sound as required to maintain consistency of environment 104. In one embodiment, app 304 may synchronize the played back sound (e.g., a song) with the sounds currently within environment 104, thereby further reducing disruption of environment 104 when the sound is replayed within environment 104. For example, app 304, or software on the server, matches the recorded song/music with a song/music in a playlist of personal device 302 and may initiate play of the matching song/music through speaker 236 when conditions within environment 104 fall below a threshold (e.g., when ambient noise falls to a level indicating that the vehicle has stopped). Thus, personal device 302 and app 304 provides a seamless continuation of the song/music within environment 104 even when the vehicle's engine is shut off and music stops playing through the vehicle's speakers. Play of the song/music through speaker 236 may begin at a lower level than volume of the song/music projecting from the car's speakers, and may ramp up or jump up to match a level of sound within environment 104 that was present prior to that level abruptly falling. In one example, app 304 begins playback of a matched sound (e.g., an identified song) as an identified position within the sound (e.g., playback of an identified song is started at a position within the song that matches the position where the song stopped playing within environment 104). In one aspect, volume of sounds played through speaker 236 is based upon sensed volume proximate speaker 236, to avoid harming an infant's sensitive ears by attempting to match volume as heard elsewhere in the vehicle. Where sensors 204 are not located with the car seat, a compensatory reduction in volume of sounds played through speaker 236 may be made, for example as a function of distance between a location of sensors 204 and the car seat.

Replayed sounds and movements may include music, engine noise and weather noise where applicable (e.g., rain, wind, thunder, tires moving on a wet road), and vibration to create the illusion of continued travel of the vehicle within environment 104. System 100 may include a user interface 262 that allows a parent or other caregiver to record a personal message, song, favorite piece of music or successful soothing noises commonly used with a child occupying the car seat (customized sound). System 100 is then programmed, by a user, to play the customized sound, for example when the microprocessor determines, via input from microphone 220, that a child occupying car seat 102 is crying or fussing. In one embodiment, controller 202 determines that the child is crying or fussing by detecting a particular pitch or pattern of sounds associated with a child crying. An individual crying or fussing pattern may be recorded and identified via user interface 262, such that parameters associated with the crying or fussing pattern are saved in memory of controller 202 and/or personal device 302.

In one example of operation, a parent or guardian uses app 304 to record samples of their child crying or fussing, and to identify the samples as such. App 304 may then identify sound detected by microphone 220 as crying or fussing, and may initiate play of one or more customized sounds to soothe the child. System 100 thereby provides a hands-free and automatic soothing of a distressed child, allowing a driver of the vehicle to concentrate on driving.

Figure 4:
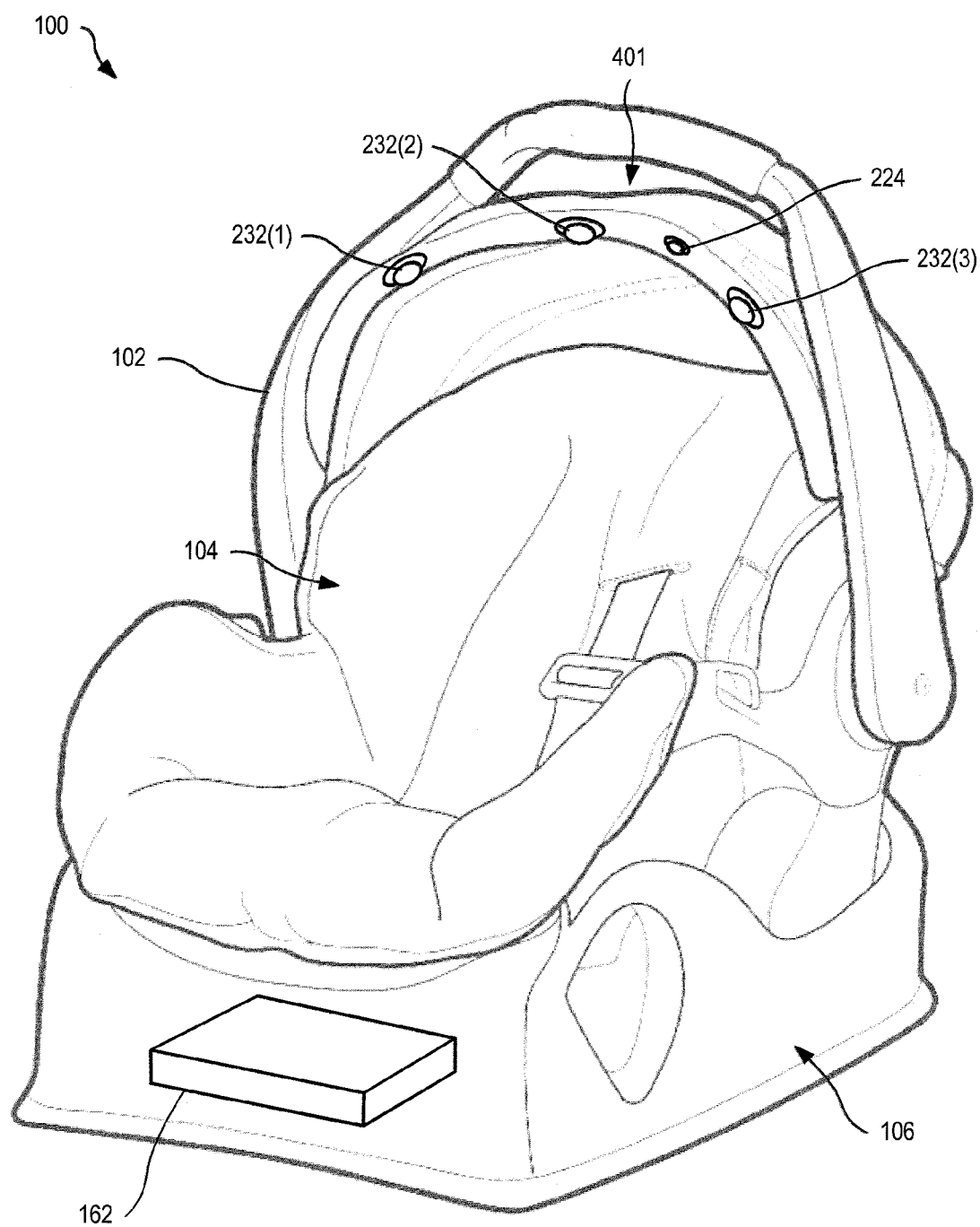
FIG. 4 shows a car seat configured with a system for soothing and prolonging sleep of a child, featuring light sources configured with a shade, in an embodiment.

FIG. 4 shows the car seat 102 and base 106 of FIG. 1 fitted with three exemplary light sources 232(1)-(3) positioned within a cover/shade 401 of car seat 102. In one embodiment, light sources 232 are each one or more LEDs that are wired to housing 162 of system 100. The wiring may include a connector that electrically couples and decouples automatically when car seat 102 is attached to, and removed from, base 106. In another embodiment, light sources 232 are lenses that couple by fiber optical paths to LEDs positioned within housing 162, where the optical path has a connector that automatically optically couples and decouples when car seat 102 it attached to and remove from base 106. In yet another embodiment, one or more LEDs and optional lenses are positioned to project light onto cover/shade 401. Optical sensor 224 is also shown positioned on cover/shade 401 and may communicatively couple with housing 162 in similar ways to light sources 232.

In one example of operation, controller 202 intermittently activates one or more of light sources 232 to achieve a brightening and rapid dimming effect that mimics oncoming headlights as detected by optical sensor 224. Controller 202 may also control (collectively and/or individually) brightness of light sources 232. Controller 202 may increase a number of light sources 232 activated until a desired "brightest" level of light is achieved, and then controller 202 may turn all light sources 232 off. In another example of operation, controller 202 gradually increases brightness of one or more light sources 232 and then turns them off when they reach a desired brightness level. In another example of operation, controller 202 controls one or more of light sources 232 to gradually dim after achieving brightest illumination. The "brightest" level of light may be chosen to mimic headlights of a passing car without being bright enough to awaken a sleeping child. When built into a rear-facing infant seat, light sources 232 may be more constant, to imitate illumination by headlights following from the rear. Optionally, light sources 232 may be configured and/or mounted with one or more of a rear dash of a vehicle, a ceiling of the vehicle, with the rear of a driver's headrest or passenger's headrest or elsewhere in the vehicle, as may be appropriate for the style of the particular vehicle and the direction in which child passengers face when riding in the car.

In one example of operation, controller 202 and/or personal device 302 may sense levels and one or more characteristics of light within environment 104 using optical sensor 224 and then automatically control light emitted from light sources 232 to maintain a consistent light level and similar light characteristic within environment 104. For example, controller 202 and/or personal device 302 may, based upon levels of light detected at optical sensor 224, activate/ramp up light emitted from one or more of light sources 232 to maintain an average ambient light level within environment 104 as the vehicle turns off a highway and onto side streets heading towards a destination, and as the car pulls into a destination (e.g., a garage). In another example, optical sensor 224 may detect a frequency of flicker of light within environment 104, a hue of light within environment 104 or other characteristics of light within environment 104, including a time period between lighting events, and control light sources 232 to emulate the detected light characteristic(s) within environment 104, when a change in the light characteristic(s) is detected, or when ambient light within environment 104 falls below threshold. It will be appreciated that optical sensor 224 and controller 202/personal device 302 may record a pattern of light levels and characteristics for a time prior to ramping up/activating light output by light sources 232.

In one embodiment, light sources 232 are a fiber optic display that is woven or otherwise built into cover/shade 401. Washable fibers and fabric may be chosen so that the seat cover/shade 401 may be cleaned as necessary. Fibers may be selectively and/or collectively illuminated to emulate one or more of a twinkling star pattern, an illumination pattern similar to a pattern sensed at the light sensor, or to form one or more shapes, letters, numbers or pictures in varying colors. As described above with respect to customized sound played by controller 202, controller 202 may be programmed to produce an attention-grabbing light display (e.g., the aforementioned shapes or pictures, or another pattern of light) when controller 202 determines that the infant or child within environment 104 is fussing or crying, or upon controller 202 receiving a command at user interface 262. System 100 may thus automatically and/or manually soothe a fussy or crying baby, or entertain a baby while driving in the car. Since light sources 232 may be firmly affixed with or incorporated with a car seat or shade, and since light sources 232 are relatively low mass relative to the car seat portions into which they are incorporated, system 100 does not create hazards for the infant or other vehicle occupants, such as potential projectiles created when using mirrors and other car-mounted toys and devices. Further, since system 100 may operate autonomously, system 100 does not interfere with or distract the driver of the vehicle. Since light sources 232 and speaker 236 are configured with cover/shade 401 and/or car seat 102, the optical display and generated sounds may continue while car seat 102 is transferred from base 106 to a stroller or to an end destination (e.g., into a home), such that the transfer is less disruptive to the infant within environment 104.

Figure 5:
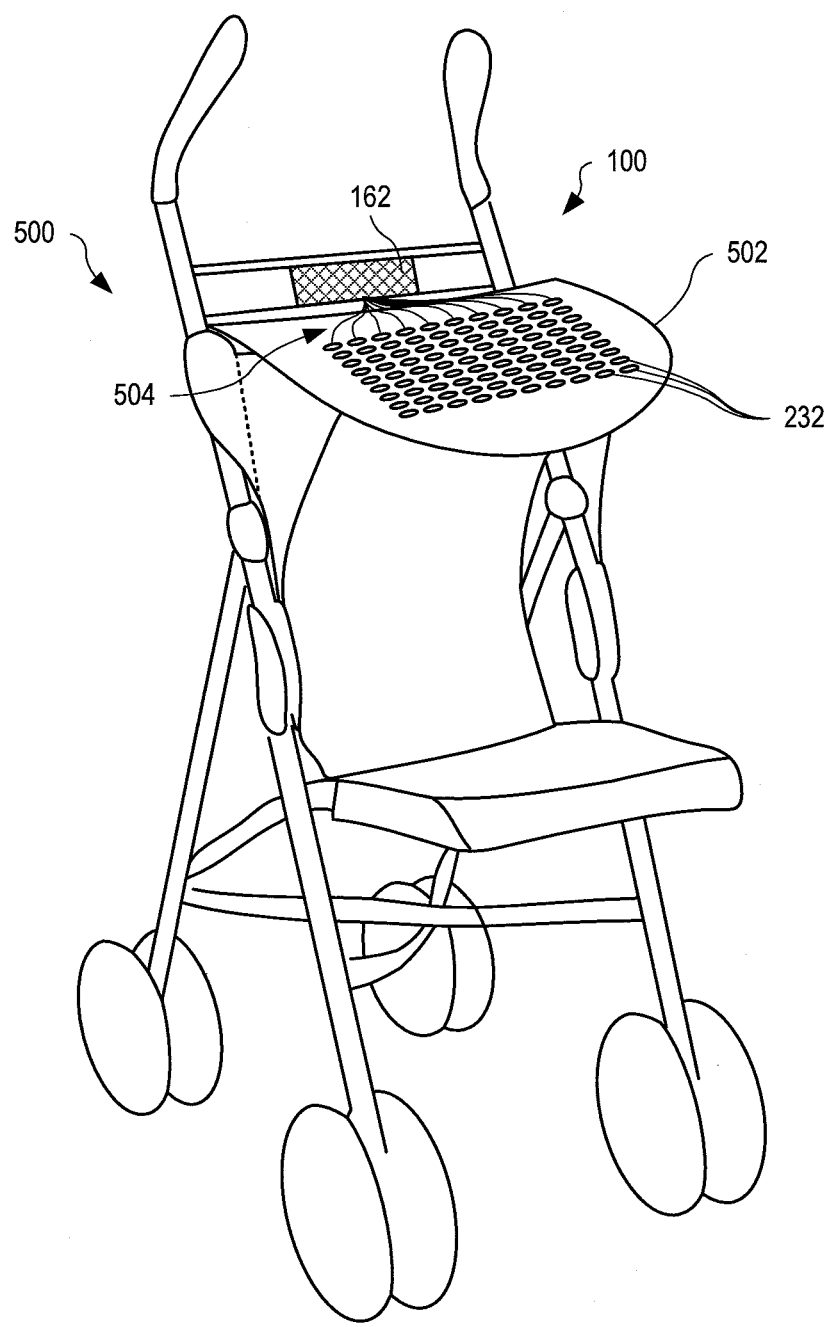
FIG. 5 shows a stroller configured with a system for soothing and prolonging sleep of a child, in an embodiment.

The aforementioned light, sound and motion features may also be incorporated directly into a stroller, a hood configured with or available as a retrofit to a stroller and/or a cushion designed for fitting into and accommodating harnessing of the stroller. As shown in FIG. 5, a hood or shade 502 configured with, or for retrofit assembly with, a stroller 500 includes a plurality of light sources 232 (lights/LEDs/lenses/fiber optics). For purposes of illustration, light sources 232 are shown as LEDs; however, light sources 232 may be implemented as other types of light source, such as fiber optics woven into shade 502, or a combination thereof. Light sources 232 are shown as an array, but may be arranged differently without departing from the scope hereof. In an alternate embodiment, light is projected onto an underside of shade 502.

Light sources 232 are wired to housing 162 of system 100, which may be connected with shade 502, or which may alternately electrically connect with light sources 232 via a port, wire or other connection 504. In one aspect, housing 162 connects with shade 502 via a fixed or connectable/disconnectable wire, sized to allow a user to place housing 162 in a parent console or pouch of the stroller. In one example of operation, controller 202 intermittently activates one or more of light sources 232 to achieve a light display for entertaining a child riding within stroller 500. Controller 202 may (collectively and/or individually) control brightness of light sources 232, a flicker frequency of light sources 232 and hue of light sources 232. Light sources 232 may be selectively and/or collectively illuminated to emulate one or more of a twinkling star pattern, an illumination pattern similar to a sensed pattern, as described above, or to form one or more shapes or pictures in varying colors. In one embodiment, light sources 232 are implemented as a liquid crystal display (LCD), organic liquid crystal display (OLED), or similar light emitting display technology.

As described above with respect to customized sound played by controller 202, controller 202 may be programmed to produce an attention-grabbing light display (e.g., the aforementioned shapes, letters, numbers or pictures, or another pattern of light) when controller 202 determines that the infant or child within environment 104 is fussing or crying, or upon controller 202 receiving a command at user interface 262. System 100 may thus automatically and/or manually soothe a fussy or crying baby, or entertain a baby while riding in the stroller. Likewise, controller 202 may be programmed to automatically initiate motion or sound, as described above, upon determining a fussing or crying pattern, or upon receiving a command at user interface 262. The aforementioned light display may be synchronized with motion and/or sound to further engage a fussy or crying child. In one aspect, an educational display may be created by playing a recording that is synchronized with a rhythm or pattern of the light display, or which names shapes, letters, numbers or pictures as formed by light sources 232.

Although all features of system 100 may be incorporated into the above described stroller 500/shade 502, a simpler stroller model may omit optical sensor 224.

Figure 6:
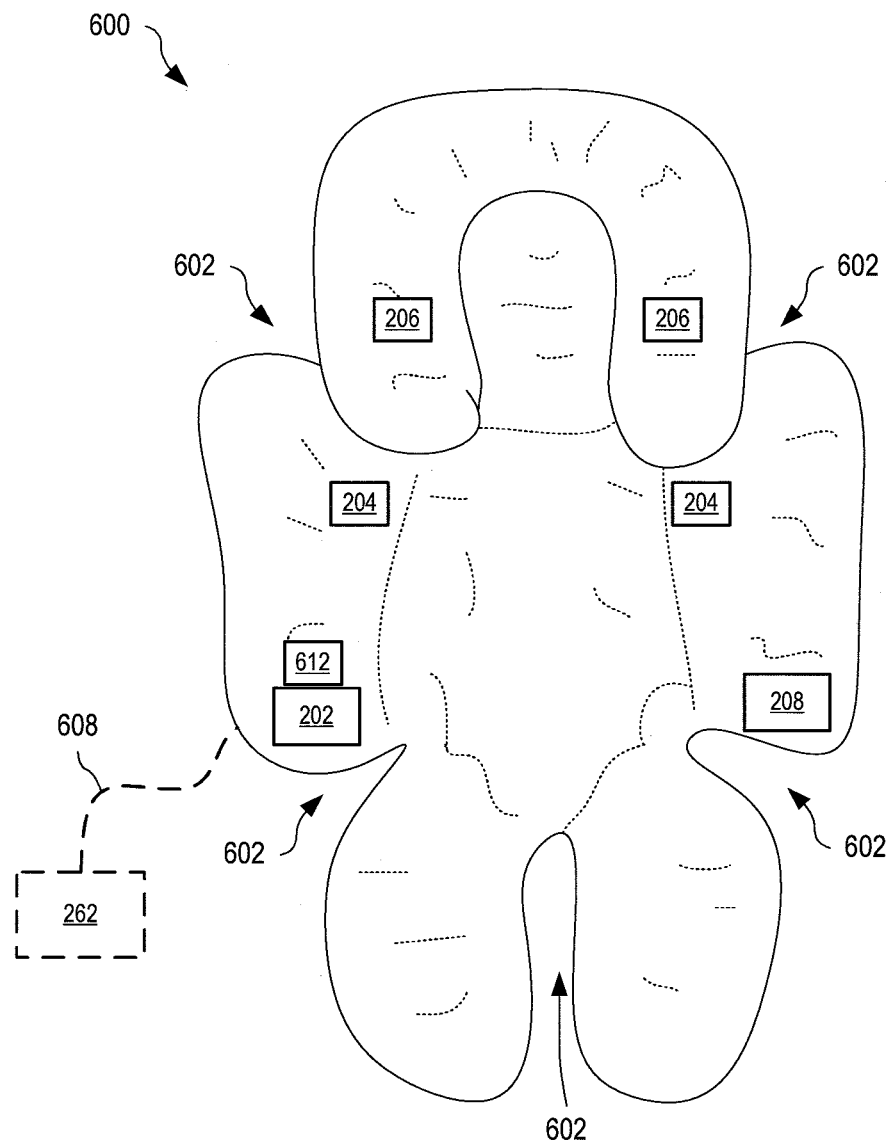
FIG. 6 shows a cushion system for soothing and prolonging sleep of a child, in an embodiment.

Additionally or alternately, as shown in FIG. 6, a removable cushion 600 may incorporate certain or all components of system 100. Cushion 600 includes openings/cutouts 602 for accommodating harnessing and buckles of car sear 102 and/or stroller 500. Cushion 600 may incorporate controller 202, sensor(s) 204, actuator(s) 206, and a power source 208, or controller 202 and power source 208 (e.g., a battery) may be housed together within housing 260, which connects with cushion 600 via an electrical connection 608. Electrical connection 608 may be a wire, a port, a plug or other feature facilitating transfer of power between power source 208 and elements within or on cushion 600. For example, actuator(s) 206 may be positioned within or on cushion 600 and powered by power source 208 via electrical connection 608, to minimize presence of hard or rigid elements that might cause discomfort when placed with a cushion.

In one aspect, actuators 206 include vibrating elements within, running through or moveable through cushion 600 (e.g., as mechanical actuators 230). Actuators 206 may also include speaker 236; however, it will be appreciated that the speaker may be incorporated with cushion 600, or with housing 260, where it is desirable to place a noise-generating element or elements farther from an infant or child's ears. Light source(s) 232 are for example configured with a non-supporting portion or portions of cushion 600 (i.e., sides or other portions of the cushion that the infant or child does not lie or sit upon), to prevent light from sources 232 from being blocked by the infant or child's body. Likewise, in order to enable optical sensor(s) 224 to sense light, optical sensor(s) 224 may be placed with a non-supporting portion of cushion 600.

As described above with respect to FIGS. 2-3, one or more of sensors 204 (e.g., microphone 220, accelerometer 222) may communicate wirelessly with controller 202 (e.g., controller 202 includes a wireless transceiver implementing a protocol such a Bluetooth, or other protocols).

A temperature sensor 612 may be incorporated with system 100, to avoid overheating of system 100 and/or its components, and may be especially desirable where system 100 is incorporated within cushion 600 and is therefore closer to an infant or child's body. Temperature sensor 612 communicates with controller 202. When sensed temperature reaches or exceeds a predetermined upper threshold, controller 202 automatically reduces operation or shuts off parts or all of system 100, in order to allow cooling. Once temperature reaches or falls below a lower threshold, controller 202 may restore system 100 to full functionality.

Returning to car seat 102, in one embodiment, one or more of microphone 220, accelerometer 222, optical sensor 224, mechanical actuator 230, light source 232, amplifier 234 and speaker 236 are incorporated within personal device 302 (e.g., a smart phone), wherein car seat 102 incorporates a receptacle or socket at a safe position (e.g., on a rear or underside surface) on car seat 102 for personal device 302. In this embodiment, optical paths may still be incorporated to convey light from a screen of personal device 302 to cover/shade 401.

Accelerometer 222 may also be a smart sensor capable of identifying a vibration pattern while the vehicle is being driven and indicating the identified vibration pattern to controller 202 or personal device 302. Optionally, controller 202 receives signals from accelerometer 222 and determines a vibration pattern within the received signals. For example, controller 202 may determine whether the ambient vibration within environment 104 is regular (for example, as may be the case along a smooth or regularly-featured highway surface) or irregular (e.g., upon city streets or rough country roads) and then mimic the sensed vibration after or as ambient vibration falls below a predefined threshold level within thresholds 218. For example, controller 202 may control mechanical actuator 230 to simulate a determined pattern when ambient levels of detected vibration fall below the threshold, and/or when the determined pattern slows, changes or stops. For example, controller 202 may control mechanical actuator 230 to generate vibration with changes associated with a driving pattern of an individual driver (for example, mimicking irregularities in vehicle speed). Controller 202 may control mechanical actuator 230 to simulate a particular driving surface. In an example of operation, controller 202 controls mechanical actuator 230 to generate periodic and marked increases in vibration separated by lower vibration level intervals, thereby simulating passage of the vehicle over pavement seams on a highway.

Optionally or additionally, car seat base 106 and/or car seat 102 includes internal elements to generate, under control of controller 202, a "bump" imitative of movement detected as a vehicle is driven along a bumpy road or over pavement seams. In one example, mechanical actuator 230 includes an internal ratcheted element (i.e., a toothed wheel) that catches against a resistive but movable engaging element, to produce a periodic and regular bump effect to environment 104. The ratchet/wheel for example turns under control of a motor that is in turn controlled by controller 202. Controller 202 may for example control speed of the motor such that the bumping effect produced by mechanical actuator 230 matches an ambient bumping sensed within environment 104 when the vehicle is driving over a particular surface. In another example, mechanical actuator 230 includes a ball element or elements that are shuttled up an internal ramp/channel within the car seat or car seat base, and allowed to drop to produce the bumping sensation. In another example, an internal, spring biased element is periodically compressed and released such that the element bumps the car seat or car seat base. Bumping created by the two last mentioned systems may likewise be matched to an ambient bumping sensation.

Controller 202 may also be programmed to determine a vibration pattern characteristic of driving near a person's home. For example, a user may initiate a calibration mode, wherein controller 202 records recording 216 from input from one or more sensors 204 while (e.g., for 5 or 10 minutes) the vehicle is driven near the person's home. Controller 202 may then process and save at least a portion (e.g., the portion prior to the vehicle stopping) of recording 216 as a "home stretch" data recording. Once calibrated, during use, controller 202 may compare detected vibration with the "homestretch" data recording to determine whether the vehicle is approaching the destination, wherein controller 202 actuates one or more actuators 206 (e.g., mechanical actuator 230, light source 232, amplifier 234 and speaker 236) in preparation of the vehicle stopping. For example, controller 202 may controller one or more of actuators 206 to obscure the familiar driving pattern such that the infant within environment 104 does not subconsciously recognize the home stretch and awake in anticipation of a stop.

Where system 100 is partially or completely housed by or attached to car seat 102, rather than attached to car seat base 106, car seat 102 containing the sleeping infant/child may be removed from the vehicle and taken into the house while motion, noise and/or light associated with riding in the vehicle continues within environment 104, thus allowing a parent or caregiver to unlock a door, enter a building, unpack the vehicle, prepare a bed for the infant/child and/or attend to other necessary chores prior to transferring the child to the bed or allowing the child to wake.

User interface 262 may include a display for displaying sensed parameters or other data to a user. For example, controller 202 may use interface 262 to display information indicative of one or more of average ambient vibration, range of average ambient vibration as a particular vehicle is driven around town, the level of ambient vibration when the user slows down and/or when the user stops but has not yet turned off the vehicle. The driver or other adult may then indicate, via interface 262, where one or more vibration thresholds should be set, and a maximum level of vibration from mechanical actuator 230. In one embodiment, controller 202 recommends threshold setting(s) via interface 262. By displaying or otherwise communicating vibration data to the user, controller 202 may allow the user to place the unit in his or her car for a period of time and receive customized setting recommendations that mimic his or her typical driving pattern.

In the embodiment of FIG. 2, housing 260 may be configured with an interface that allows controller 202 to communicate information indicative of sensed parameters to a personal device (iPod, smart phone or other personal device), thereby allowing a user to save optimal configuration of system 100, and thereby transfer that information to another device. That is, controller 202 may communicate with another device docked with or wirelessly connected with system 100. For example, an app running on the other device facilitates the user setting one or more of thresholds and maximum and minimum levels within controller 202. Such functionality may occur in real-time while the other device is communicatively coupled with controller 202 or occur when the other device is next communicatively coupled with controller 202.

Controller 202 may also introduce random changes to environment 104 by randomly varying one or more of vibration/movement, light and sounds generated within environment 104. Such random variations may produce a more natural effect.

In one embodiment, software 214 comprises artificial intelligence such that controller 202 learns, based upon detected distress of the infant, an appropriate type and level of stimulus to apply to environment 104. For example, when controller 202 detects a cry from the infant within environment 104, controller 202 reviews a most recent level and type of stimulus applied to environment 104. Where the level of applied stimulus had increased, controller 202 learns not to increase the stimulus at such a rate. Where the level of applied stimulus had decreased, controller 202 learns not to decrease the stimulus at such a rate. Other learning ability may be included without departing from the scope hereof.

In another aspect, system 100 is incorporated into or attached with a passenger seat of a private or public vehicle, such as a car, truck, van, limousine, bus, shuttle, train, or other passenger-carrying vehicle, such that system 100 may enhance sleep of a passenger sitting directly in the seat. For example, system 100 may be incorporated into a car. Actuators 206 may be positioned within, configured with or, in the case of light sources 232, projecting onto passenger seats of the car. Sensors 204 may be positioned within or configured with the passenger seats or positioned elsewhere in the vehicle. Functionality of controller 202 may be incorporated directly into an existing microprocessor/processor/control system of the car, or may be provided separately. Each controller 202 may control one or more seats.

Figure 7:
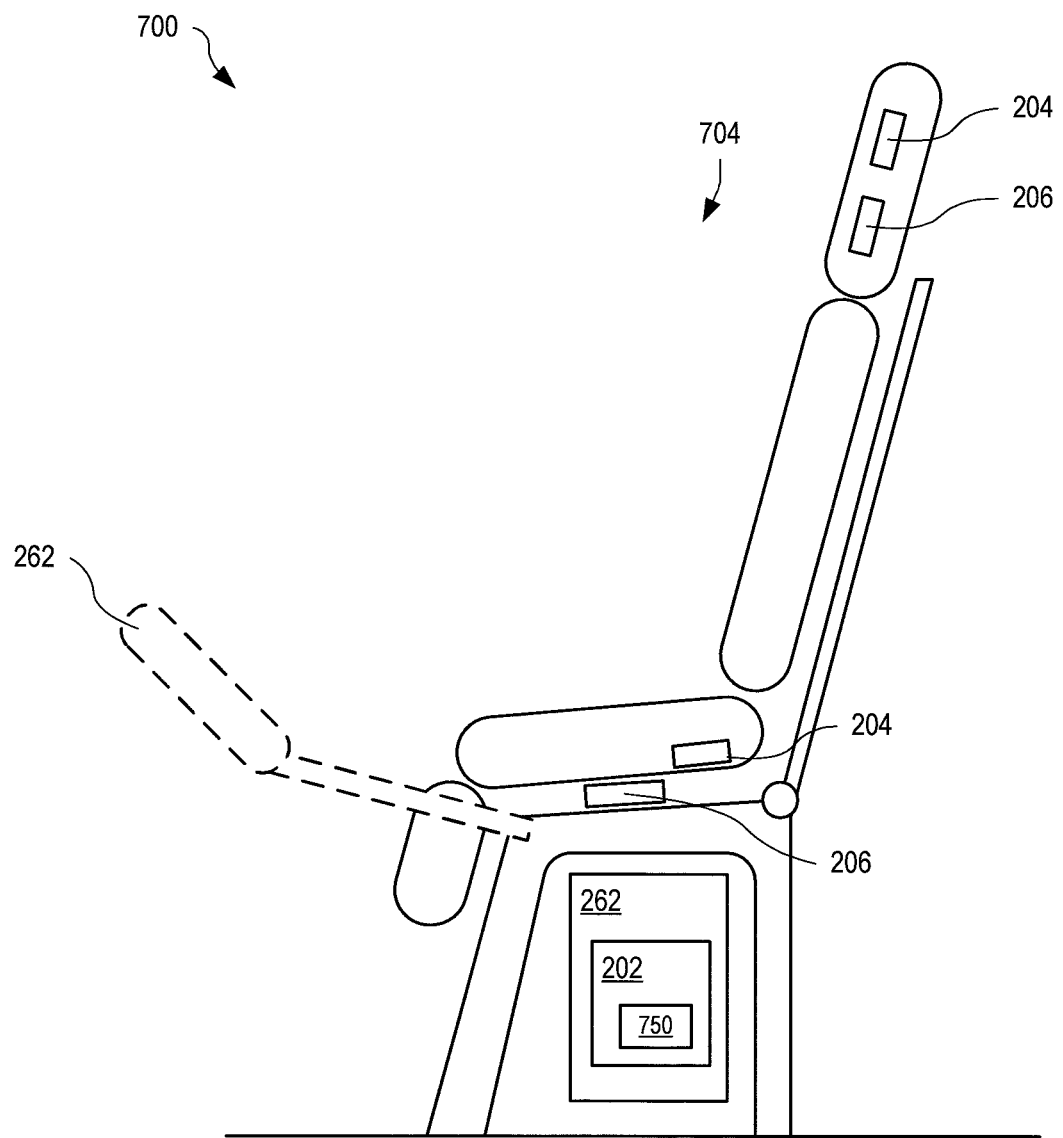
FIG. 7 shows a system for soothing and prolonging sleep configured with a bus seat, in an embodiment.

In one aspect, shown in FIG. 7, system 100 is incorporated with a public transport seat 700, for example, a bus seat. As described above, system 100 detects levels and patterns of motion, noise and/or light in an environment 704 of seat 700, and controls actuators 206 to maintain motion, noise and/or light levels and patterns when ambient levels fall below a threshold and/or when ambient patterns change or stop (i.e., when the bus stops for fuel or at drop-off/pick-up stops).

In order to avoid accidentally sleeping past his or her stop, a passenger sitting in a seat hosting or attached with system 100 may utilize user interface 262 to enter a desired stop (e.g., selecting the stop from a list of stops), a desired wake-up time and/or a desired waking period, along with a wake-up stimulus or stimuli selected from a change in vibration pattern or level, a change in type or level of auditory stimuli and/or a change in level or pattern of illumination. In one embodiment, system 100 includes a real-time clock 750. A user may set a desired waking period or wake-up time, for example, 10 minutes prior to arriving at a desired stop or reaching a planned time of stop. Upon commencement of the waking period or upon reaching the wake-up time, stimuli applied by actuators 206/controller 202 may stop completely, or actuators 206 may provide motion (e.g., vibration), auditory and/or visual stimulation, which may be different from levels or pattern of stimulation used to encourage sleep, in order to encourage the user to wake. Where a desired stop is selected, system 100 may communicate with a bus tracking system to determine a real-time estimate of arrival time for the desired stop, and may initiate the waking period at the desired number of minutes from reaching the stop (as selected or input by the user), according to the tracking system estimate.

It will be appreciated that wake-up features may also be incorporated into system 100 when used with a car seat. For example, if instead of desiring that a child sleep through an arrival, a parent/caregiver wishes the child to be awake and alert upon arrival at a destination, the parent/caregiver may enter a wake-up time or waking period via user interface 262 or personal device 302, to encourage waking by removing stimulation, changing stimulation, initiating a personal wake-up message, etc.

COMBINATIONS OF FEATURES

Although particular combinations of features are recited in the claims and/or disclosed in the specification, these combinations are not intended to limit the disclosure of the embodiments. Many of these features may be combined in ways not specifically recited in the claims and/or disclosed in the specification. Features of each dependent claim may combine together with other claims in the set, even where claims are not directly linked. For example:

(a) A system for soothing or prolonging sleep of a child in an environment of a car seat includes at least one actuator configured with the car seat or a base of the car seat, for imparting one or more of movement, sound and light to the environment. At least one sensor senses at least one condition of the environment, and a controller controls the at least one actuator to induce one or more of motion, sound, and light to the environment based upon the at least one sensed condition, such that change to the environment is reduced below a level that would awaken the child when sleeping.

(b) In the system denoted as (a), the controller may operate to increase output of one or more of movement, sound, and light from the at least one actuator to the environment when a level of at least one sensed condition reduces below a predefined threshold.

(c) In the systems denoted as (a) and (b), the controller, the sensor, and the actuator may share a common housing.

(d) In the systems denoted as (a)-(c), the housing may be attachable to the car seat or to the base of the car seat.

(e) In the systems denoted as (a)-(d), the system may be configured with the car seat or the base.

(f) In the systems denoted as (a), (b), (d) and (e), the controller and the actuator may be contained within a common housing and the sensor may be remote from the housing and in communication with the controller.

(g) In the systems denoted as (a)-(d), the sensor may comprise a microphone and the actuator may comprise a speaker, wherein the controller receives signals from the microphone and determines an ambient noise level within the environment, compares ambient noise level to a predefined threshold, and activates the speaker to generate sound within the environment when the ambient noise level is below the threshold.

(h) In the system(s) denoted as (g), the generated sound may include one or more of white noise, engine noise, traffic noise, conversation, music and pre-recorded customized noise.

(i) In the systems denoted as (g) and (h), the microphone and speaker may share a housing with the actuator and the controller.

(j) In the systems denoted as (g)-(i), the microphone, the speaker, the actuator, the controller and the sensor may be configured with the car seat or the base.

(k) In the systems denoted as (a), (b), (d) and (g)-(i), the controller may be a smart phone, an MP3 player, an iPod, a tablet, an iPod nano, an iPod mini, or a microcontroller.

(l) The systems denoted as (a)-(k), may further include an interface for one or more of a memory stick, a memory card, a smart phone, an iPad, a tablet computer and a personal device.

(m) In the systems denoted as (a)-(l), the controller may store a recording of ambient noise in memory.

(n) In the system(s) denoted as (m), the controller may determine a match to the recording to identify at least one sound within the environment.

(o) In the system denoted as (n), the controller may select an item within a playlist based upon the identified sound, and may play the item through the speaker.

(p) In the system denoted as (o), the item may be white noise, engine noise, traffic noise, calm conversation, intermittent conversation, argumentative conversation, news broadcasts, talk radio, and/or music.

(q) In the systems denoted as (n)-(p), the controller may control the speaker to generate sound similar to the identified sound when a level of the sensed sound falls below the threshold.

(r) In the systems denoted as (a)-(q), the controller may increase volume of a generated sound in proportion to the ambient noise level with respect to a threshold.

(s) In the systems denoted as (n)-(r), the controller may include software that matches an identified sound with an item stored in a playlist on a personal device, wherein the controller plays the item through the speaker.

(q) In the system(s) denoted as (s), the software may synch the item with the detected sound when playing the item.

(t) In the systems denoted as (m)-(s), the controller may determine that the infant is crying or fussing when the identified sound matches the sound of a child crying and/or fussing.

(u) In the system(s) denoted as (t), the controller may replay an item from a playlist when the controller determines that the infant is crying or fussing.

(v) In the system(s) denoted as (t) and (u), the controller may modify the stimulus to the environment when the controller determines that the infant is crying or fussing.

(w) In the systems denoted as (a)-(v), the at least one actuator may include a light source that is configured with the car seat to impart light into the environment.

(x) In the system(s) denoted as (w), the light source may be configured with a cover/shade of the car seat.

(y) In the systems denoted as (a)-(x), the at least one sensor may include an optical sensor for sensing one or both of an ambient light level and an ambient light characteristic within the environment, and wherein the controller controls a/the light source to generate light within the environment based upon the sensed ambient light level or characteristic, the characteristic selected from a hue of light, a flicker frequency, a brightening or dimming period and a time period between light events.

(z) In the systems denoted as (w)-(y), the light source may be a fiber optic display woven or otherwise built into the cover/shade.

(aa) In the system(s) denoted as (z), the controller may control the fiber optic display to emulate, in varying colors, one or more of: twinkling stars, a pattern, a shape, and a picture.

(bb) In the system(s) denoted as (z) and (aa), the controller may control the fiber optic display to emulate, in varying colors, one or more of: twinkling stars, a pattern, a shape, and a picture, upon detecting that the child is fussing or crying.

(cc) A sleep and wake system for public transport includes at least one actuator configured with a seat of a public transportation vehicle, for imparting one or more of movement, sound and light to an environment of the seat. A sensor senses a condition of the environment of the seat. A microprocessor compares the sensed condition with a threshold level for the sensed condition. A controller controls the at least one actuator to add one or more of motion, sound, and light to the environment based upon the at least one sensed condition, when the sensed condition approaches or falls below a threshold level, such that a level or characteristic of the sensed condition remains relatively constant despite an ambient decrease in the sensed condition.

(dd) In the system denoted as (cc), a user interface allows for selection of a desired stop, a desired wake-up time and/or a desired waking period. The actuator alters output of the movement, sound or light to wake a sleeping passenger at or prior to the desired stop or wake up time, and/or according to the desired waking period.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for soothing or prolonging sleep of a child in an environment of a car seat, comprising:
   at least one actuator configured with the car seat or a base of the car seat for imparting one or more of movement, sound and light to the environment;
   at least one sensor for sensing at least one condition of the environment;
   a controller for controlling the at least one actuator to induce one or more of motion, sound, and light to the environment based upon the at least one sensed condition such that a level of the sensed condition remains substantially constant.

2. The system of claim 1, wherein the controller operates to increase output of one or more of movement, sound, and light from the at least one actuator to the environment when a level of at least one sensed condition reduces below a predefined threshold.

3. The system of claim 1, the controller, the sensor, and the actuator sharing a common housing.

4. The system of claim 1, the housing being attachable to the car seat or to the base of the car seat.

5. The system of claim 1, the system being configured with the car seat or the base.

6. The system of claim 1, wherein the controller and the actuator are contained within a common housing and the sensor is remote from the housing and in communication with the controller.

7. The system of claim 1, wherein the sensor comprises a microphone and the actuator comprises a speaker, wherein the controller receives signals from the microphone and determines an ambient noise level within the environment, compares ambient noise level to a predefined threshold, and activates the speaker to generate sound within the environment when the ambient noise level is below the threshold.

8. The system of claim 7, the generated sound comprising one or more of white noise, engine noise, traffic noise, conversation, music and pre-recorded customized noise.

9. The system of claim 7, wherein the microphone and speaker share a housing with the actuator and the controller.

10. The system of claim 7, wherein the microphone, the speaker, the actuator, the controller and the sensor are configured with the car seat or the base.

11. The system of claim 7, the controller selected from the group comprising a smart phone, an MP3 player, an iPod, a tablet, an iPod nano, an iPod mini, and a microcontroller.

12. The system of claim 7, further comprising an interface for one or more of a memory stick, a memory card, a smart phone, an iPad, a tablet computer and a personal device.

13. The system of claim 12, the controller storing a recording of the ambient noise in memory.

14. The system of claim 13, the controller determining a match to the recording to identify at least one sound within the environment.

15. The system of claim 14, the controller selecting an item within a playlist based upon the identified sound and playing the item through the speaker.

16. The system of claim 15, the item comprising one or more of white noise, engine noise, traffic noise, calm conversation, intermittent conversation, argumentative conversation, news broadcasts, talk radio, and music.

17. The system of claim 14, the controller controlling the speaker to generate sound similar to the identified sound when a level of the sensed sound falls below the threshold.

18. The system of claim 17, the controller increasing volume of the generated sound in proportion to the ambient noise level with respect to the threshold.

19. The system of claim 14, the controller comprising software that matches the identified sound with an item stored in a playlist on a personal device, wherein the controller plays the item through the speaker.

20. The system of claim 19, wherein the software synchs the item with the detected sound when playing the item.

21. The system of claim 14, wherein the controller determines that the infant is crying or fussing when the identified sound matches the sound of a child crying and/or fussing.

22. The system of claim 21, wherein the controller replays an item from a playlist when the controller determines that the infant is crying or fussing.

23. The system of claim 21, wherein the controller modifies the stimulus to the environment when the controller determines that the infant is crying or fussing.

24. The system of claim 1, wherein the at least one actuator comprises a light source that is configured with the car seat to impart light into the environment.

25. The system of claim 24, the light source being configured with a cover/shade of the car seat.

26. The system of claim 25, wherein the at least one sensor comprises an optical sensor for sensing one or both of an ambient light level and an ambient light characteristic within the environment, and wherein the controller controls the light source to generate light within the environment based upon the sensed ambient light level or characteristic, the characteristic selected from a hue of light, a flicker frequency, a brightening or dimming period and a time period between light events.

27. The system of claim 26, wherein the light source comprises a fiber optic display woven or otherwise built into the cover/shade.

28. The system of claim 27, wherein the controller controls the fiber optic display to emulate, in varying colors, one or more of: twinkling stars, a pattern, a shape, and a picture.

29. The system of claim 28, wherein the controller controls the fiber optic display to emulate, in varying colors, one or more of: twinkling stars, a pattern, a shape, and a picture, upon detecting that the child is fussing or crying.

30. A sleep and wake system for public transport, comprising:
- at least one actuator configured with a seat of a public transportation vehicle, for imparting one or more of movement, sound and light to an environment of the seat;
- a sensor for sensing a condition of the environment of the seat;
- a microprocessor for comparing the sensed condition with a threshold level for the sensed condition; and
- a controller for controlling the at least one actuator to add one or more of motion, sound, and light to the environment based upon the at least one sensed condition, when the sensed condition approaches or falls below the threshold level, such that a level or characteristic of the sensed condition remains relatively constant despite an ambient decrease in the sensed condition.

31. The system of claim 30, further comprising a user interface for selecting one or more of a desired stop, a desired wake-up time and a desired waking period; wherein the actuator alters output of the movement, sound or light to wake a sleeping passenger at or prior to the desired stop or wake up time, and/or according to the desired waking period.

* * * * *